United States Patent
Nyman et al.

(10) Patent No.: US 6,433,927 B1
(45) Date of Patent: Aug. 13, 2002

(54) LOW COST AMPLIFIER USING BULK OPTICS

(75) Inventors: Bruce Nyman, Freehold, NJ (US); Gary S. Duck, Nepean; Neil Teitelbaum, Ottawa, both of (CA)

(73) Assignee: JDS Uniphase Inc., Nepean (CA)

( * ) Notice: Subject to any disclaimer, the term of this patent is extended or adjusted under 35 U.S.C. 154(b) by 0 days.

(21) Appl. No.: 09/725,129

(22) Filed: Nov. 29, 2000

Related U.S. Application Data

(60) Provisional application No. 60/168,391, filed on Dec. 2, 1999.

(51) Int. Cl.$^7$ ............................................... H01S 3/091
(52) U.S. Cl. ...................................................... 359/343
(58) Field of Search ............................... 359/346, 342, 359/343

(56) References Cited

U.S. PATENT DOCUMENTS

| | | | | |
|---|---|---|---|---|
| 4,553,238 A | * | 11/1985 | Shaw | 372/6 |
| 4,837,771 A | * | 6/1989 | Baer | 372/75 |
| 5,089,786 A | * | 2/1992 | Tamura | 359/333 |
| 5,195,149 A | * | 3/1993 | Pfeiffer | 385/28 |
| 5,293,438 A | * | 3/1994 | Konno | 385/35 |
| 5,677,920 A | * | 10/1997 | Waarts | 372/6 |
| 5,717,517 A | * | 2/1998 | Alfano | 359/342 |
| 5,719,973 A | * | 2/1998 | Monroe | 385/34 |
| 5,930,421 A | * | 7/1999 | Sakano | 385/38 |
| 6,031,849 A | * | 2/2000 | Ball | 372/6 |
| 6,088,500 A | * | 7/2000 | Zmundzinski | 385/131 |
| 6,115,401 A | * | 9/2000 | Scobey | 372/100 |
| 6,198,858 B1 | * | 3/2001 | Pan | 385/24 |
| 6,301,421 B1 | * | 10/2001 | Wickham | 385/126 |

FOREIGN PATENT DOCUMENTS

| | | | | |
|---|---|---|---|---|
| EP | 0 895 103 A1 | * | 2/1999 | G02B/6/14 |
| EP | 1 128 502 A2 | * | 8/2001 | H01S/3/06 |
| JP | 02071345 | * | 12/1991 | G02F/1/35 |
| JP | 03156693 | * | 1/1993 | H01S/3/094 |
| JP | 08234046 A | * | 9/1996 | G02B/6/14 |
| JP | 09051136 A | * | 2/1997 | G02F/1/35 |
| JP | 08162779 | * | 1/1998 | H01S/3/10 |

OTHER PUBLICATIONS

Hanafusa, H. et al., "Thermally–Diffused expanded core fibres for low–loss and inexpensive photonic components." Elect. Lett. vol. 27, No. 21, Cotober 1991. pp. 1968–1969.*

* cited by examiner

Primary Examiner—Thomas H. Tarcza
Assistant Examiner—Andrew R. Sommer
(74) Attorney, Agent, or Firm—Lacasse & Associates, LLP

(57) ABSTRACT

The present invention relates to an in-line optical amplifier that can be coupled to optical fiber, wherein the amplifying medium has a substantially larger mode field than the optical fiber to which it is coupled. The present invention has realized a design to utilize a very high power pump launching a multimoded signal having approximately 1 W of pump power into a block of erbium doped glass having a mode field diameter orders of magnitude larger than the mode field diameter of erbium doped fiber. This invention provides a relatively inexpensive optical amplifier that is compatible for use in an optical fiber telecommunications system or for other uses. Advantageously, this invention provides a device that does not require unwieldy lengths of erbium doped fiber to form an amplifier. By using a block of glass having a rare earth therein, packaging, temperature stabilizing and temperature tuning of the amplifier also become practicable. Furthermore, a cylindrical block of glass having planar ends, lends itself to applying coatings or filters thereto, thereby forming selective filters at ends of the erbium doped block to allow the pump light in, and the signal light in at opposite ends, while preventing light at the pump wavelength to propagate out with the amplified signal.

22 Claims, 5 Drawing Sheets

LOW COST AMPLIFIER USING BULK OPTICS

This application claims priority from U.S. Provisional Application No. 60/168,391 filed Dec. 2, 1999.

FIELD OF THE INVENTION

This invention relates generally to optical amplifiers and more particularly, to an in-line optical amplifier that can be coupled to optical fibre, wherein the amplifying medium has a substantially larger mode field diameter than the optical fibre to which it is coupled.

BACKGROUND OF THE INVENTION

There is considerable interest in using rare earth doped fiber amplifiers to amplify weak optical signals for both local and trunk optical telecommunications networks. The rare earth doped optical amplifying fibers exhibit low-noise, have relatively large bandwidth with low polarization dependence, substantially reduced crosstalk problems, and low insertion losses at the relevant operating wavelengths which are used in optical communications. Furthermore, rare earth doped optical fiber amplifiers can be coupled end-to-end to a transmission fiber, and coupled, through a directional coupler, to a laser diode pump. The directional coupler is designed to have a high coupling ratio at the pump wavelength and a low coupling ratio at the signal wavelength so that maximum pump energy is coupled to the amplifier with minimal signal loss. When the amplifying medium is excited with the pump laser, signal light traversing the amplifier experiences gain. The pump energy may be made to propagate either co-directionally or counter-directionally relative to the signal energy, selected for higher power efficiency or better noise performance To date, erbium fiber amplifiers appear to have the greatest potential for the high amplification necessary to overcome the signal losses. Erbium doped fiber amplifiers (EDFAs) operate at 1550 nm which is of particular interest for optical communication systems because, in this wavelength region, the amplifiers exhibit low insertion loss, broad gain bandwidth (approximately 30 nm) and relatively polarization insensitive gain.

Such amplifiers, pumped with light having a wavelength of 980 nm can have a gain as high as 26 dB but require as much as 76 mW of launched pump power. It has generally been desired to achieve a higher gain together with a lower value of pump power coupled into a fiber, and such optimization of EDFAs has been a goal. The pump required to launch a signal into a single mode fibre is quite costly.

The present invention has realized a design to utilize a very high power pump launching a multimoded signal having approximately 1 W of pump power. Currently, high power optical pump lasers are commercially available at a relatively low cost. Such high power pumps are not compatible for use with erbium doped fibre in the manufacture of EDFAs. However, this invention provides a relatively inexpensive optical amplifier that is compatible for use in an optical fibre telecommunications system or for other uses.

This invention also provides a device that does not require unwieldy lengths of erbium doped fibre to form an amplifier. In contrast, the instant invention uses a block of glass having a mode field diameter orders of magnitude larger than the mode field diameter of erbium doped fibre.

By enlarging the mode field of the signal beam, greater pump energy can be applied without the significant difficulty and loss which are present when coupling pump energy into a single mode fiber amplifier.

By using a block of glass having a rare earth therein, packaging, temperature stabilizing and temperature tuning of the amplifier become practicable.

Furthermore, a cylindrical block of glass having planar ends, lends itself to applying coatings or filters thereto, thereby forming selective filters at ends of the erbium doped block to allow the pump light in, and the signal light in at opposite ends, while preventing light at the pump wavelength to propagate out with the amplified signal.

SUMMARY OF THE INVENTION

In accordance with the invention there is provided, an optical amplifier comprising: an optical waveguide for carrying an optical signal to be amplified, the optical waveguide having an output end for outcoupling the optical signal;

a substantially collimating lens optically coupled with the output end of the optical waveguide for receiving the optical signal and for providing a substantially collimated beam to be amplified, the substantially collimated beam having a substantially larger mode field diameter than the optical signal being carried by the optical waveguide;

a block of light transmissive material sized to carry the substantially collimated beam for amplification, the block of light transmissive material being comprised of a gain medium doped with a rare-earth element, the block being disposed to receive the substantially collimated optical beam; and, a high power pump disposed to impart optical energy to the block; and, an output optical waveguide disposed to couple focused light of the optical signal after it has been amplified within the block of light transmissive material.

In accordance with the invention there is further provided, an optical amplifier comprising: a first optical waveguide for providing a signal to be amplified, the waveguide having an average mode field diameter $d_1$;

a second optical waveguide optically coupled with the first waveguide for receiving the signal after it has been amplified, the second waveguide having a mode field diameter $d_2$, where $d_1$, and $d_2$ are substantially smaller than $d_3$;

a light transmissive amplifying medium for guiding a beam having a mode field diameter of at least $d_3$, said light transmissive amplifying medium being disposed to receive light from the first optical waveguide and to provide amplified light to the second optical waveguide;

a pump optically coupled with the light transmissive amplifying medium for providing pump energy to the amplifying medium.

In accordance with the invention there is further provided, an optical amplifier for amplifying an incoming optical signal comprising a glass block in the form of a light transmissive medium sized to carry a beam having a mode field diameter of at least 100 $\mu$m, the block being doped with a rare earth for amplifying light passing therethough when the rare earth is excited by a pump beam, the light transmissive medium having a filter at an end thereof for passing the pump beam and for substantially preventing the optical signal to be amplified from passing therethrough, and having a filter at another end thereof, for passing the signal to be amplified and for substantially preventing the pump beam from passing therethrough.

In accordance with the invention there is provided, an optical amplifier comprising:

an input optical fibre for providing a signal to be amplified;

an amplifying medium comprising a light transmissive material having a diameter substantially greater than the diameter of the input optical fibre, for receiving the signal to be amplified;

a lens for substantially expanding a mode field diameter of a beam of light of the signal to be amplified, optically coupled between the input waveguide and the amplifying medium;

a pump source for providing high intensity optical pump energy to the amplifying medium; and, an output optical fibre for receiving an amplified optical signal from the amplifying medium.

In accordance with another aspect of the invention a method of amplifying an optical signal is provided, comprising the steps of:

coupling the optical signal from an optical fibre into an amplifying medium having a diameter a plurality of orders of magnitude greater than a mode field diameter of the signal propagating with the optical fibre such that the mode field diameter of the signal is converted to a substantially larger collimated beam than the signal propagating with the optical fibre;

pumping optical energy having a different wavelength from the optical signal into the amplifying medium, and receiving the amplified optical signal from the amplifying medium.

In accordance with the invention there is further provided, a method of amplifying an optical signal comprising the steps of:

launching a beam carrying the optical signal from an optical fibre;

substantially increasing a mode field diameter of the beam and providing the beam to an amplifying medium;

pumping optical energy having a different wavelength from the optical signal into the amplifying medium, and receiving an amplified optical signal from the amplifying medium and, decreasing the mode field diameter of the amplified signal and coupling the amplified signal to an output optical fibre.

BRIEF DESCRIPTION OF THE DRAWINGS

Exemplary embodiments of the invention will now be described in conjunction with the drawings in which.

DETAILED DESCRIPTION

Rare earth doped fibers for amplifying weak signals for both local and trunk optical telecommunications networks have been of interest for some time now, because of their low insertion loss, broad gain bandwidth and low polarization sensitivity. In use, the doped optical fiber is normally coupled to a pump so that a weak optical input signal at some wavelength within the rare earth gain profile experiences a desired amplification. Pump light which can be coupled into the optical fiber via a directional coupler may propagate either co-directionally or counter-directionally within the fiber relative to the signal. The directional coupler can have a high coupling ratio at the pump wavelength and a low coupling ratio at the signal wavelength.

When the fiber is not pumped, the signal experiences loss due to ground state absorption by the rare earth ions. As the pump power that is applied to the fiber is increased, the loss due to ground level absorption decreases (i.e., gain is negative but increasing) until, at some value of pump power, there is no net signal absorption (i.e. the gain is zero). This is referred to as the transparency state. Thereafter, as the pump power in the fiber is increased, a higher proportion of rare earth ions are in their excited state and the stimulated emission from the upper lasing state to the ground state becomes stronger than the absorption from the ground state to the upper lasing state, resulting in a net positive gain at various wavelengths. Thus, the optical amplifier, when pumped so as to populate the upper lasing level, produces a net positive gain above the pump threshold level and the fiber acts as an amplifier.

Pumping is effected by a separate laser or lamp which emits photons of an appropriate energy which is higher than that which corresponds to the signal wavelength. The electrons are excited from the ground state to one or more pump bands, which are above the upper lasing level. It is important that the spontaneous lifetime of the upper lasing level exceed that of the pump bands by a significant margin to allow heavy population of the upper level. When a photon at the laser wavelength interacts with an excited ion in the upper lasing state., stimulated emission can occur. The photon can come from either previous spontaneous emission, stimulated emission, or an input signal.

This invention utilizes a cylindrical block of erbium doped glass as an amplifying medium. In contrast to erbium doped optical fibre amplifiers, the cylindrical block has a cross section orders of magnitude greater than the cross section of optical fibre. Furthermore a very high power pump laser is utilized to provide a required amount of energy to the erbium-doped block. Essentially, the mode field diameter of a beam propagating within an optical fibre is expanded to propagate through and traverse the cylindrical block.

Figure 1:
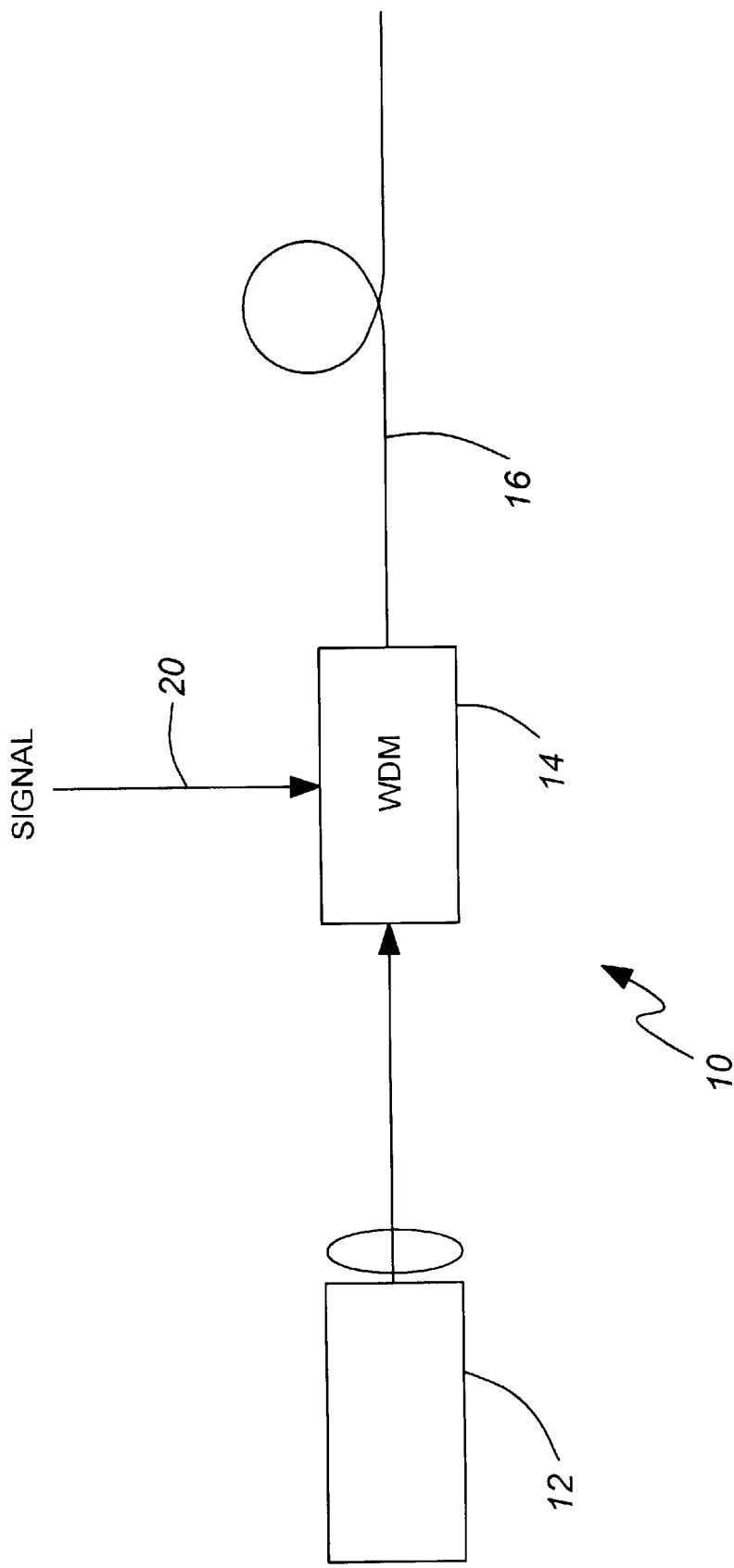
FIG. 1 is a conventional erbium doped fibre optical amplifier.

Turning now to FIG. 1, a prior art erbium doped optical fibre amplifier 10 is shown having a pump 12 coupled with an incoming optical signal 20 to be amplified. A laser diode 12 provides an output signal having a wavelength of 980 nm that is coupled with an incoming signal 20 to be amplified having a wavelength of 1550 nm. A laser diode pump at 1480 nm can alternatively be used. A coupler 14 couples the two signals together to be output on a suitable length of erbium doped optical fibre 16.

Figure 2:
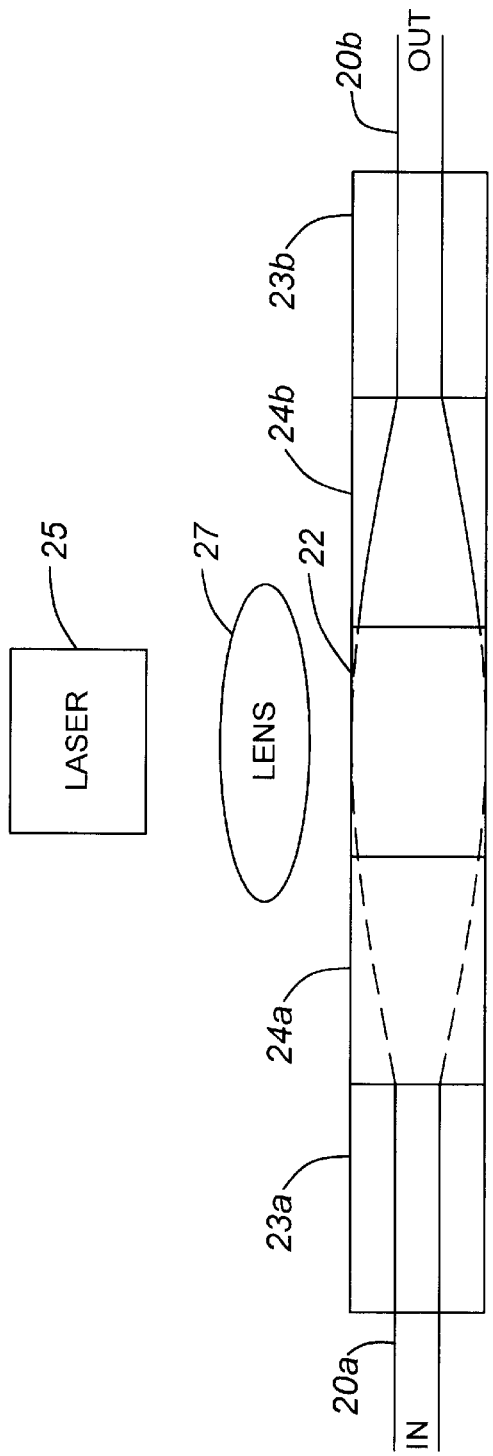
FIG. 2 is a schematic illustration of an amplifier in accordance with the present invention.

Turning now to FIG. 2, a block of glass 22 in the form of a rod having a diameter of approximately 350 μm is shown; the block 22 is doped with erbium. A suitable glass is commercially available under the name MM-2, an erbium doped phosphate laser glass produced by Kigre, Inc. This material includes high dopant percentages and provides high gain. A typical length of block 22 required for a net gain of 20 dB is in the range of 1 cm. Notwithstanding, the overall performance depends upon many variables; the same physical principles used in current optical fiber based amplifiers apply. The block 22 is disposed between two substantially quarter pitch GRIN lenses 24a and 24b which are disposed between two optical fiber sleeves 23a and 23b housing input optical fibre 20a and output optical fibre 20b. In operation, light to be amplified of a wavelength of approximately 1550 nm is launched into optical fiber 20a and is output on optical fibre 20b. After the light enters the GRIN lens 24a it is collimated and the mode field of the beam is expanded to a diameter that can be supported by the erbium doped glass block 22. Hence the beam diameter is expanded to occupy most of the block 22, as it traverses the block. Simultaneously a laser 25 optically coupled with the block 22 having a wavelength of 980 nm outputs and pumps the block medium 22 with a high power 1 watt signal that is distributed across and into the block by the lens 27 disposed between the block 22 and the laser 25. As the signal passes through it gains energy from the excited medium 22 and becomes amplified. The mode gain of the medium is calculated by the following equations:

$$G = \exp(g \cdot L)$$

$$g = \sigma \cdot N$$

where g is the gain coefficient, L is the length of the gain medium, and σ is the emission cross section, and N is the $Er^{3+}$ ion density. Conditions of strong inversion with high pump power are assumed for the calculation. The resulting gain coefficient can reach 22 dB/ cm. given an $Er^{3+}$ concentration of $10^{21}$ $cm^{-3}$, and emission cross section of $5 \times 10^{-21} cm^2$.

Figure 3:
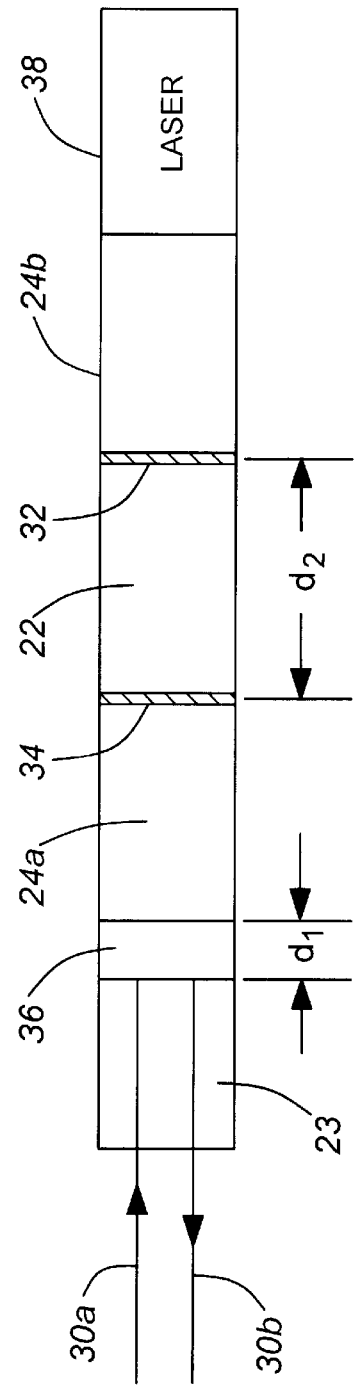
FIG. 3 is a schematic illustration of an alternative embodiment of the present invention.

Referring now to FIG. 3, a preferred embodiment of the invention is shown, wherein both input and output optical fibres are coupled into the same end of the device. This type of arrangement is preferred and offers advantages when providing hermetic devices. A block 22 similar to the one shown in FIG. 2 is provided having a first optical filter 34 and a second optical filter 32 at opposing ends. The filter 34 is designed to pass light having a wavelength of 1550 nm while reflecting light having a wavelength of 980 nm generated by the pump laser. Conversely, the filter 32 is designed to pass light having a wavelength of 980 nm and reflect light incident thereon having a wavelength of 1550 nm. The pump laser 38 is optically coupled to the erbium doped block 22 via a lens 24b. Both input and output optical fibres 30a and 30b respectively are disposed with an optical fibre ferrule 23 and are coupled optically coupled to the block of rare earth doped medium 22 via a light transmissive spacer element 36 and a GRIN lens 24a. For optimum coupling, it is preferred that the optical path length of the spacer is equal to the optical path length of the block 22, such that the beam traversing both elements traverses equal path lengths.

In operation, a signal light having wavelength 1550 nm is launched from input optical fibre 30a and is collimated to a substantially larger beam with a substantially larger mode field diameter as it traverses the GRIN lens 24a. The light then passes through the filter 34 and enters and substantially fills the erbium doped block of glass 22. Simultaneously, the high power laser 38 provides a pump signal having a wavelength of 980 nm to the block 22 after being substantially collimated by lens 24b. Amplified light having a wavelength of 1550 nm is reflected by filter 32 and passed through the filter 34 to couple into the output fibre 30b.

If the rare earth doped block 22 is dimensioned to absorb substantially all the pump energy, the filter 34 is not necessary. In addition, the pump laser 38 can be coupled through a different lens, than a GRIN lens, or no lens at all. In particular, the rare earth medium 22 can be formed with a taper to a 100 micron diameter and coupled directly to the laser 38.

In addition to filters 34 and 32 at the end surfaces of the block 22, advantageously in accordance with the present invention, additional optical elements can be formed on the block 22, such as diffraction elements or additional filters, or lenses, by etching, depositing or adhering to the end faces of the block 22. Input fibres 20a, 30a and output fibres 20b, 30b can advantageously be polarization maintaining fibre pigtails to provide a polarization maintaining amplifier.

Figure 4:
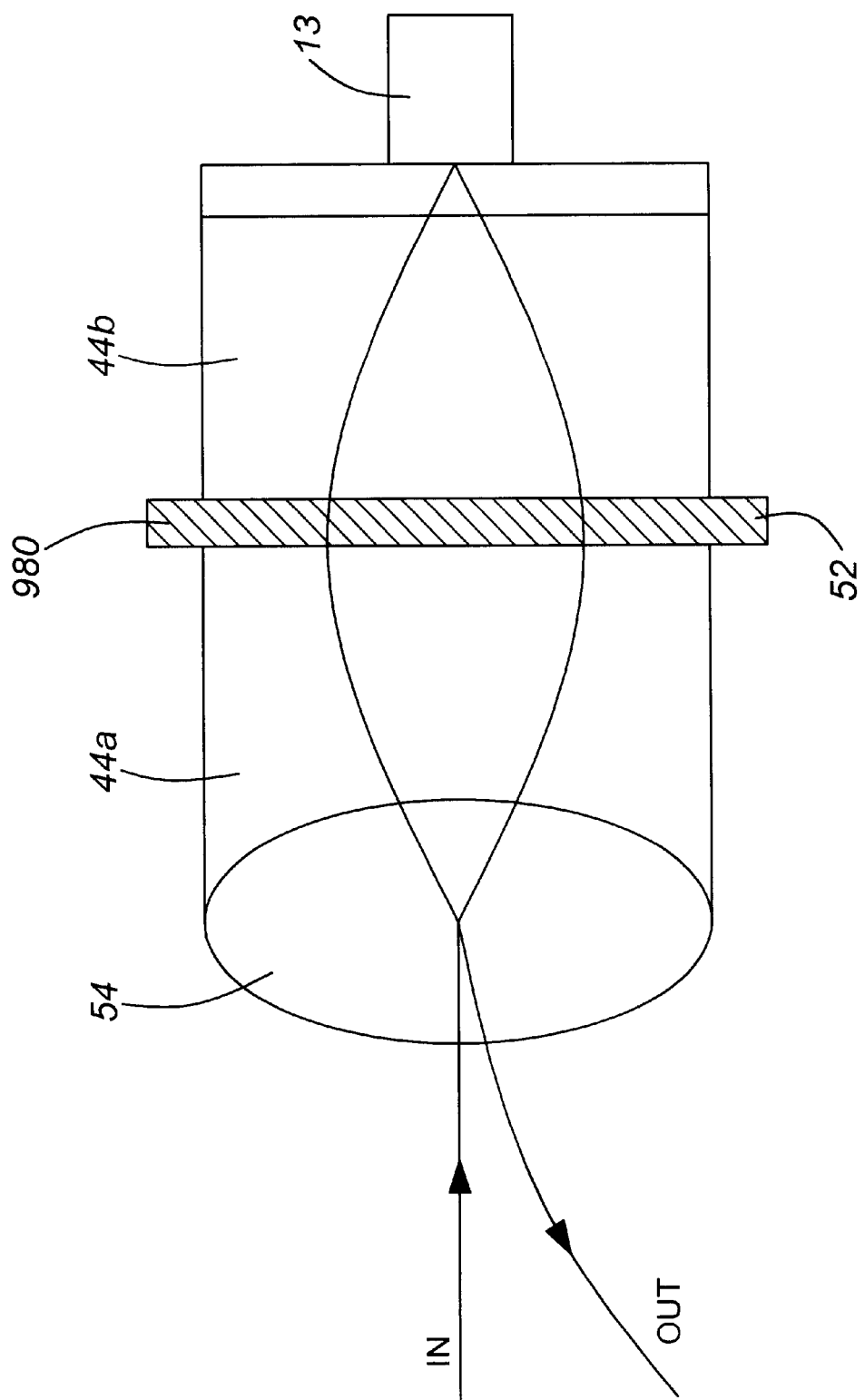
FIG. 4 is a schematic illustration of an alternative embodiment of the present invention in which the amplifying medium has optical power.

An alternative embodiment of the invention is shown in FIG. 4 wherein two quarter pitch focusing/collimating glass GRIN lenses are doped with erbium and form an optical amplifier. A first GRIN lens 44a is coated on an input/output end with a 1550 nm bandpass filter 54; at an opposite end of the lens is a coating 52 that serves as a 980 nm bandpass filter. A second lens 44b is disposed directly against the filter 52. At an outwardly facing end of the second GRIN lens 44b is a laser pump 38; The operation of this device is substantially the same as the amplifier described in FIG. 3, however amplification takes place inside the lens.

Figure 5:
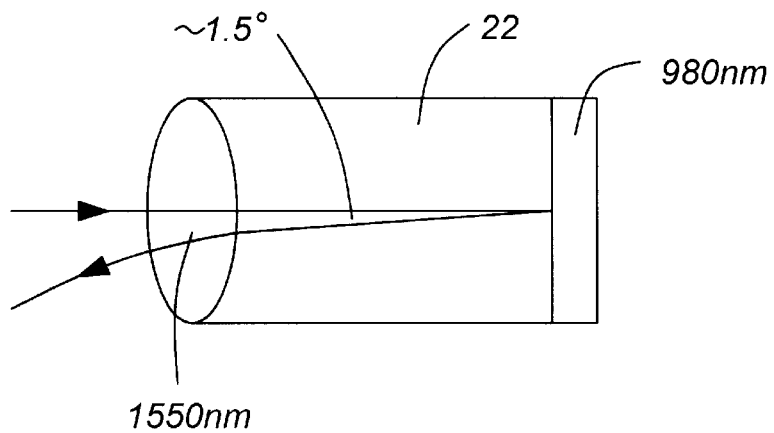
FIG. 5 is a schematic view of the amplifying medium illustrating angular separation of input and output signals.

FIG. 5 illustrates the input signal 30a and output signal 30b launched at a small angle, for instance of approximately 1.5 degrees in order to easily separate the input signal from the output signal.

Figure 6A:
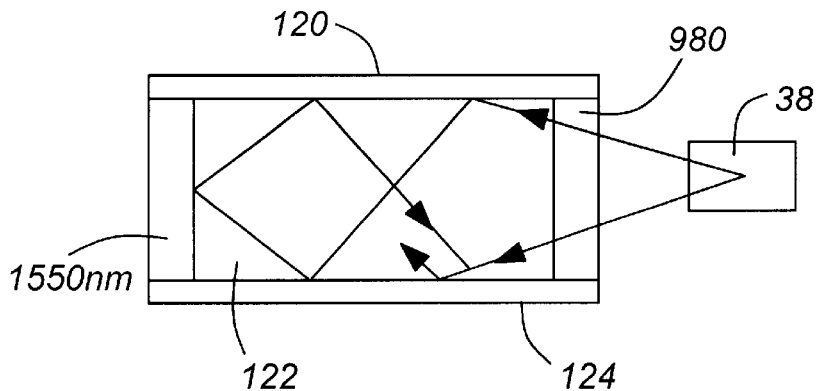
FIG. 6a is a schematic view of the amplifying medium illustrating total internal reflection of the pump signal.
Figure 6B:
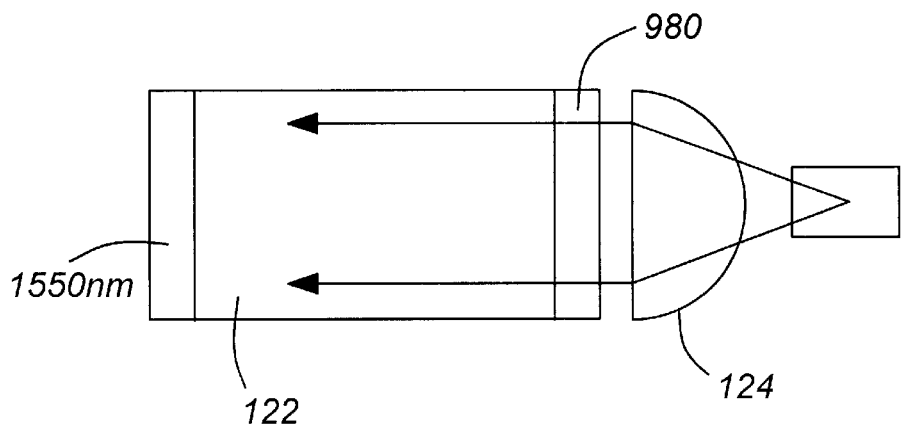
FIG. 6b is a schematic view of the amplifying medium illustrating a collimated pump signal.

As shown in FIGS. 6a and 6b, the amplifying medium 122 can be formed to provide waveguiding for the pump energy without guiding the signal Coating the block 22, for example with a metal cladding 120 will keep pump light within the block to assist in inducing the maximum pump light absorption. With the pump source 38 coupled directly to the metal cladded block 122 total internal reflection causes the pump light to reflect from the sidewalls within the block 122. As shown in FIG. 6b, with a collimating lens 124 coupling the laser pump 38 to the block 122, an expanded beam of pump light is launched through the medium 122.

Figure 7:
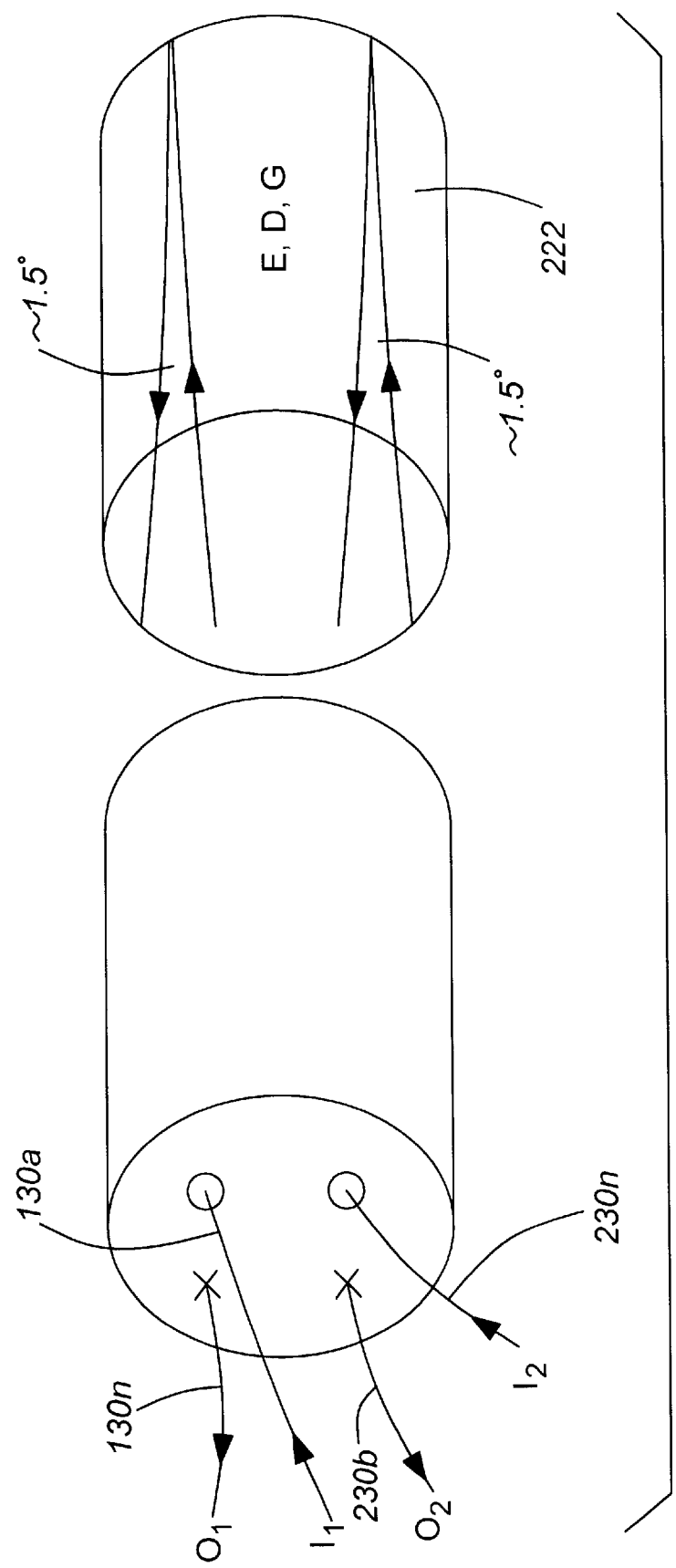
FIG. 7 is a schematic illustration of a further embodiment of the present invention in which the amplifying medium is enlarged to accommodate a plurality of input and output fibres.

Of course, due to the symmetry of a GRIN lens, multiple groups of input and output fibres 130, 230 can be disposed to amplify more than one signal at a time, as shown in FIG. 7. A larger block diameter is required to prevent the multiple signal beams from overlapping and interacting within the block 222.

What is claimed is:

1. An optical amplifier comprising:
    an optical waveguide for carrying an optical signal to be amplified, the optical waveguide having an output end for launching the optical signal;
    a substantially collimating lens optically coupled with the output end of the optical waveguide for receiving the optical signal and for providing a substantially collimated beam to be amplified, the substantially collimated beam having a substantially larger mode field diameter than the optical signal being carried by the optical waveguide;
    a block of light transmissive material sized to carry the substantially collimated beam for amplification, the block of light transmissive material being comprised of a gain medium doped with a rare-earth element, the block being disposed to receive the substantially collimated optical beam;

a high power pump disposed to impart optical energy to the block; a substantially focusing lens optically coupled with the block of light transmissive material for focusing the amplified substantially collimated beam; and, an output optical waveguide disposed to couple focused light of the optical signal after it has been amplified within the block of light transmissive material.

2. An optical amplifier as defined in claim 1, wherein the pump energy is of a wavelength that is substantially different than the wavelength of the signal to amplified.

3. An optical amplifier as defined in claim 2, wherein the block is adapted to guide the substantially collimated beam.

4. An optical amplifier as defined in claim 3, wherein the block is adapted to guide the optical energy imparted by the high power pump.

5. An optical amplifier comprising:

a first optical waveguide for providing a signal to be amplified, the waveguide having an average mode field diameter $d_1$;

a second optical waveguide optically coupled with the first waveguide for receiving the signal after it has been amplified, the second waveguide having a mode field diameter $d_2$, where $d_1$ and $d_2$ are substantially smaller than $d_3$;

a light transmissive amplifying medium for guiding a beam having a mode field diameter of at least $d_3$, said light transmissive amplifying medium being disposed to receive light from the first optical waveguide and to provide amplified light to the second optical waveguide;

a pump optically coupled with the light transmissive amplifying medium for providing pump energy to the amplifying medium.

6. An optical amplifier as defined in claim 5, wherein the light transmissive amplifying medium is a block of glass, doped with a rare earth element.

7. An optical amplifier as defined in claim 6, wherein the pump and the first and second optical waveguides are disposed at different ends of the light transmissive amplifying medium.

8. An optical amplifier as defined in claim 7, wherein the pump and the first and second optical waveguides are disposed at opposite ends of the light transmissive amplifying medium.

9. An optical amplifier as defined in claim 8, wherein the block of glass is provided with means for maintaining or varying the temperature of the block.

10. An optical amplifier as defined in claim 8, further comprising filters disposed at the opposite ends of the block of glass, the filters having different output responses.

11. An optical amplifier as defined in claim 10, wherein one of the filters disposed adjacent the pump has a pass band at a central wavelength of the pump energy, and wherein the other of the filters disposed adjacent the first and second waveguides has a pass band at a wavelength corresponding to a wavelength of the signal to be amplified.

12. An optical amplifier as defined in claim 11, further comprising a lens disposed between the two waveguides and the filter having a passband corresponding to the wavelength of the signal to be amplified for providing collimated light to the block and for providing a focused beam to the second waveguide.

13. An optical amplifier as defined in claim 6, wherein the glass block is sized to carry a beam having a mode field diameter of at least 100 μm, the block having a filter at an end thereof for passing the pump beam and for substantially preventing the optical signal to be amplified from passing therethrough, and having a filter at another end thereof, for passing the signal to be amplified and for substantially preventing the pump beam from passing therethrough.

14. An optical amplifier as defined in claim 13, wherein the light transmissive medium includes a coating to promote total internal reflection within the medium.

15. An optical amplifier as defined in claim 13, wherein the light transmissive medium has optical power.

16. An optical amplifier as defined in claim 13, wherein the glass block has a graded index forming a lens.

17. An optical amplifier as defined in claim 13, further comprising an optical element formed on an end of the glass blockselected from at least one of: a diffraction element, a lens and a filter.

18. An optical amplifier as defined in claim 13 further comprising optical fibres disposed to provide light to and receive amplified light from the end of the glass block having the filter that prevents the pump beam from passing therethrough.

19. An optical amplifier as defined in claim 18, wherein the fibres are polarization maintaining fibres.

20. An optical amplifier as defined in claim 12 wherein the lens for substantially expanding a mode field diameter is a GRIN lens and wherein the input optical fibre and the output optical fibre are both housed within a ferrule, the amplifier further comprising a light transmissive spacer element disposed between the ferrule and the GRIN lens.

21. An optical amplifier as defined in claim 20, further comprising a lens disposed between the pump source and the pump medium for substantially collimating pump light from the pump source.

22. A method of amplifying an optical signal comprising the steps of:

launching a beam carrying the optical signal from an optical fibre;

substantially increasing a mode field diameter of the beam and providing the beam to an amplifying medium;

pumping optical energy having a different wavelength from the optical signal into the amplifying medium. and receiving an amplified optical signal from the amplifying medium and, decreasing the mode field diameter of the amplified signal and coupling the amplified signal to an output optical fibre.

* * * * *